United States Patent [19]

Nozuyama

[11] Patent Number: 5,202,978
[45] Date of Patent: Apr. 13, 1993

[54] SELF-TEST CIRCUIT OF INFORMATION PROCESSOR

[75] Inventor: Yasuyuki Nozuyama, Tokyo, Japan

[73] Assignee: Kabushiki Kaisha Toshiba, Kawasaki, Japan

[21] Appl. No.: 323,824

[22] Filed: Mar. 15, 1989

[30] Foreign Application Priority Data

Mar. 15, 1988 [JP] Japan .................. 63-59343

[51] Int. Cl.[5] .............................................. G06F 9/44
[52] U.S. Cl. .................. 395/575; 364/262.8; 364/259.7; 364/267; 364/267.4; 364/DIG. 1; 395/500
[58] Field of Search ... 364/200 MS File, 900 MS File; 371/27; 395/500, 375, 425, 575

[56] References Cited

U.S. PATENT DOCUMENTS

| | | | |
|---|---|---|---|
| 3,568,155 | 3/1971 | Abraham | 364/900 |
| 4,048,481 | 9/1977 | Bailey | 371/16.1 |
| 4,180,861 | 12/1979 | Armstrong | 364/900 |
| 4,313,200 | 1/1982 | Nishiura | 364/900 |
| 4,414,665 | 11/1983 | Kimura | 364/900 |
| 4,441,182 | 4/1984 | Best | 371/25 |
| 4,490,783 | 12/1984 | McDonough | 395/775 |
| 4,502,127 | 2/1985 | Garcia | 364/900 |
| 4,503,536 | 3/1985 | Panzer | 371/25.1 |
| 4,520,439 | 3/1985 | Liepa | 395/425 |
| 4,597,080 | 6/1986 | Thatte | 371/22.3 |
| 4,641,308 | 2/1987 | Sacarisen | 364/200 |
| 4,736,375 | 4/1988 | Tannhauser | 371/27 |
| 4,745,574 | 5/1988 | Aaron | 364/900 |
| 4,768,195 | 8/1988 | Stoner | 371/25.1 |
| 4,797,808 | 1/1989 | Bellay | 395/575 |
| 4,920,538 | 4/1990 | Chan | 371/16.1 |

FOREIGN PATENT DOCUMENTS

| | | |
|---|---|---|
| 184158 | 11/1985 | European Pat. Off. . |
| 2589264 | 10/1986 | France . |
| 2017361 | 3/1979 | United Kingdom . |

OTHER PUBLICATIONS

Kuban & Bruce, "The MC6804P2 Built-in Self-Test", IEEE Int. Test Conf., 1983, pp. 295-300.

Primary Examiner—Thomas C. Lee
Assistant Examiner—Eric Coleman
Attorney, Agent, or Firm—Foley & Lardner

[57] ABSTRACT

A self-test circuit for an information processor employing a microprogram control system carries out a self-test inside the information processor. The self-test circuit comprises a test data generator for generating test data which are written into specific fields of primary test microinstructions. The self-test circuit further includes a selection controller. The selection controller receives microinstructions, including the primary test microinstructions as well as the test data generated by the test data generator. During the self-test, the selection controller masks specific fields of each primary test microinstruction and supplies the test data from the test data generator in the masked specific fields to form secondary test microinstructions, which are sent to a microinstruction register. With this arrangement, the test data from the test data generator are put in the specific fields of each primary test microinstruction to generate a secondary test microinstruction so that the number and kinds of primary test microinstructions, required for testing functional blocks in the information processor will be reduced.

9 Claims, 4 Drawing Sheets

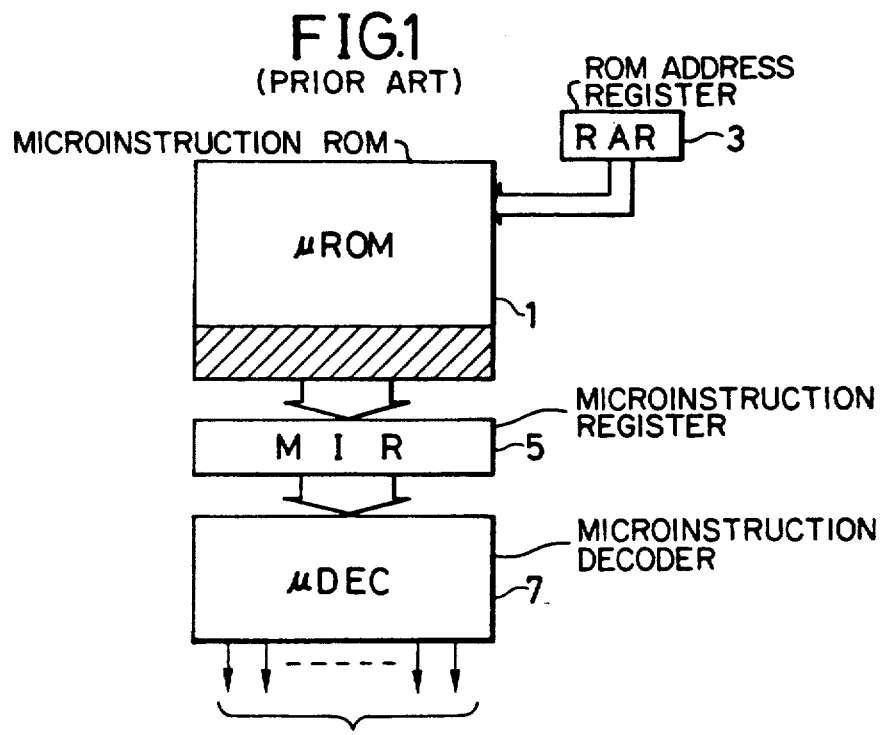
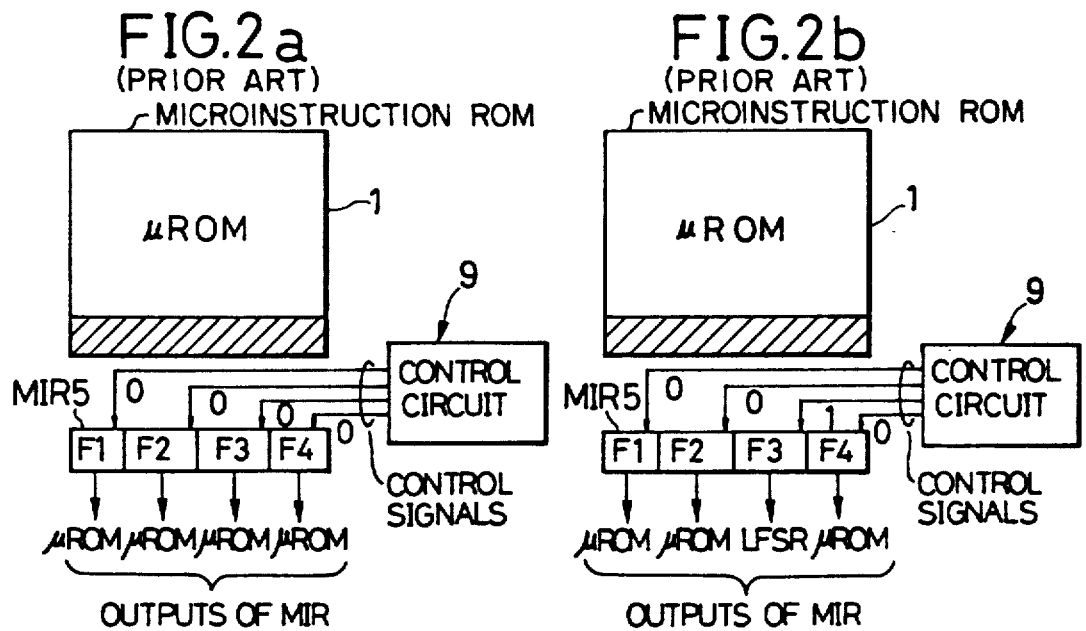

SELF-TEST CIRCUIT OF INFORMATION PROCESSOR

BACKGROUND OF THE INVENTION

1. Field of the Invention

The present invention relates to a self-test circuit in an information processor, for internally testing the respective functional blocks of the information processor, and particularly to a self-test circuit which can efficiently test the functional blocks of the information processor with the use of test microprograms of small size.

2. Description of the Prior Art

In information processors, such as microprocessors employing a microprogram control system, various functional blocks such as ALUs, registers and shifters are controlled by microinstructions to process information and to input and output data through buses, thus realizing complicated and advanced functions and requirements.

FIG. 1 is a block diagram schematically showing an information processor adopting a conventional microprogram control system. In the figure, a microinstruction storage ROM ($\mu$ ROM) 1 stores microinstructions. According to an address given by a ROM address register (RAR) 3, each microinstruction is read out of the $\mu$ ROM 1 and set in a microinstruction register (MIR) 5. A microinstruction decoder ($\mu$ DEC) 7 decodes microinstructions sent from the MIR 5 and generates control signals to control a corresponding one of functional blocks.

Recently developed information processors tend to employ a high functional microprogram control system. Such a system uses high functional microinstructions, such as loop microinstructions, conditional branch microinstructions and subroutine branch microinstructions, to control various hardware blocks more efficiently. (Details of these microinstructions are not directly related to the present invention and, therefore, their circuits and functions are not shown explicitly in the accompanying figures.) By employing these microinstructions and their functions, effects of the present invention may be remarkably be improved. It is supposed, therefore, that the $\mu$ ROM 1 stores these high functional microinstructions.

Some of the information processors adopting the microprogram control system have test microprograms to self-test the their functional blocks. In the self-test, same functional blocks which can be controlled by microinstructions are used as input data generators for generating data to be used for the test.

It is common to use as the input data generators ROMs which are usually implemented in information processors. To more minutely and efficiently perform the self-test, linear feedback shift registers which can generate pseudo random test patterns, and registers which can shift data bit by bit, may be added as the input data generators to the information processors. These added registers are also controlled by microinstructions to generate input data.

The self-test is generally carried out according to a signature analysis method. According to this method, data generated by a data generator are inputted through a bus to a functional block to be tested. With respect to the inputted data, the functional block to be tested outputs data through the bus to a parallel input linear feedback shift register. The shift register repeatedly compresses the outputted data and provides signatures. The last signature is compared with expected value prepared in advance, to automatically judge whether or not a result of the test is correct.

A sequence of such a self-tests is written in a test microprogram in advance. By executing the test microprogram, the self-test is automatically carried out. Tests on functional blocks acting as input data generators can also be carried out by compressing outputs of the blocks and generating signatures based on the outputs.

A typical self-test method will be explained with reference to FIG. 1.

A hatched part of FIG. 1 of the $\mu$ ROM 1 stores test microprograms. The test microprograms are read out of the $\mu$ ROM 1 according to an externally provided signal and executed to carry out the self-test. This test method is realized without drastically modifying any hardware. As long as the ROM 1 has a vacant area, it is possible to store test microprograms. Therefore, this self-test method is easy to employ. However, if the size of the test microprograms is too large, the capacity of the ROM 1 must be increased to store them.

Registers and buses are represented with codes in the read and write fields of each microinstruction. Therefore, in carrying out tests of reading and writing each register, two microinstructions are needed. If the number of registers and buses is large, many microinstructions are needed to carry out tests on the registers and buses, thus the size of the test microprogram is increased.

FIGS. 2a and 2b show a second conventional self-test method which can carry out the self-test without drastically increasing the size of test microprograms.

In the figures, portions F1, F2, F3 and F4 of a microinstruction register (MIR) 5 function as linear feedback shift registers, respectively, to generate pseudo random patterns to be used as codes of test microinstructions.

In normal operation shown in FIG. 2a, the portions F1 to F4 of the microinstruction register 5 receive control signals each of, for instance, "0" from a control circuit 9 and output the respective codes of a microinstruction given by a ROM 1 as they are.

In the self-test shown in FIG. 2b, a predetermined one of the portions F1 to F4 of the microinstruction register 5, for example, the portion F3 receives a control signal of, for instance, 1, from the control circuit 9, and functions as a linear feedback shift register. In every unit cycle, for example, this linear feedback shift register generates a code for a test microinstruction. The other portions F1, F2 and F4 of the microinstruction register 5 output the codes of the test microinstruction given by the $\mu$ ROM 1 as they are.

According to the second conventional method, the portion of the microinstruction register 5 acting as the linear feedback shift register can generate plural test microinstructions having different codes. Therefore, the size of test microprograms stored in the $\mu$ ROM 1 may be small. In addition, the linear feedback shift register can be constituted only by making the microinstruction register 5 shiftable and by providing a feedback loop at a predetermined location. Therefore, this method may be realized without drastically extending hardware requirements, and is advantageous if the field structure of each microinstruction is simple.

Recent microprocessors tend to employ more complicated microinstructions. For such complicated microinstructions, the second conventional method needs more and complicated peripherals to be implemented for the microinstruction register 5, resulting in making control very difficult. In addition, in spite of the sophisticated structure, it is difficult to efficiently and accurately carry out the test, because a generating source of test data is limited to the linear feedback shift register. As the number of the peripherals of the microinstruction register 5 increase, hardware for the μ ROM 1 and microinstruction register 5 increase, to lower the operation margin of the ROM 1.

According to the first conventional self-test method, the self-test can be realized with a simple modification. But testing efficiency of microinstructions for normal operation is low, so that a large quantity of microinstructions are needed for sufficiently carrying out the self-test. Due to the increase in the number of the microinstructions, the capacity of the μ ROM1 for storing the microinstructions must inevitably be increased.

On the other hand, according to the second conventional self-test method, the self-test takes place with test programs of a relatively small size. However, if microinstructions contained in the test microprograms have complicated field structures, it will require more hardware and complicate control. Then, it will be difficult to efficiently and minutely carry out the self-test.

SUMMARY OF THE INVENTION

To solve the problems of the conventional techniques, an object of the present invention is a self-test circuit of an information processor which can carry out a detailed self-test with the use of test microprograms of a small size and with a simple self-test arrangement.

In order to accomplish the object, the present invention provides a self-test circuit of an information processor employing a microprogram control system. The self-test circuit carries out a self-test inside the information processor. The self-test circuit comprises test data generating means for generating test data which are written in specific fields of primary test microinstructions. The self-test circuit further comprises selection controlling means. The selection controlling means receives microinstructions including the primary test microinstructions as well as the test data generated by the test data generating means. In the self-test, the selection controlling means masks specific fields of each primary test microinstruction and writes the test data from the test data generating means in the masked specific fields, to form a secondary test microinstruction which is sent to a microinstruction register.

With this arrangement, the test data from the test data generating means are put in the specific fields of each primary test microinstruction, to generate a secondary test microinstruction so that the number and kinds of test microinstruction required for testing functional blocks in the information processor will be reduced.

These and other objects, features and advantages of the present invention will be more apparent from the following detailed description of preferred embodiments in conjunction with the accompanying drawings.

BRIEF DESCRIPTION OF THE DRAWINGS

FIG. 1 is a block diagram showing an information processor employing a microprogram control system according to a prior art;

FIGS. 2a and 2b are views showing an example of self-test according to a prior art;

DESCRIPTION OF THE PREFERRED EMBODIMENTS

Figure 3:
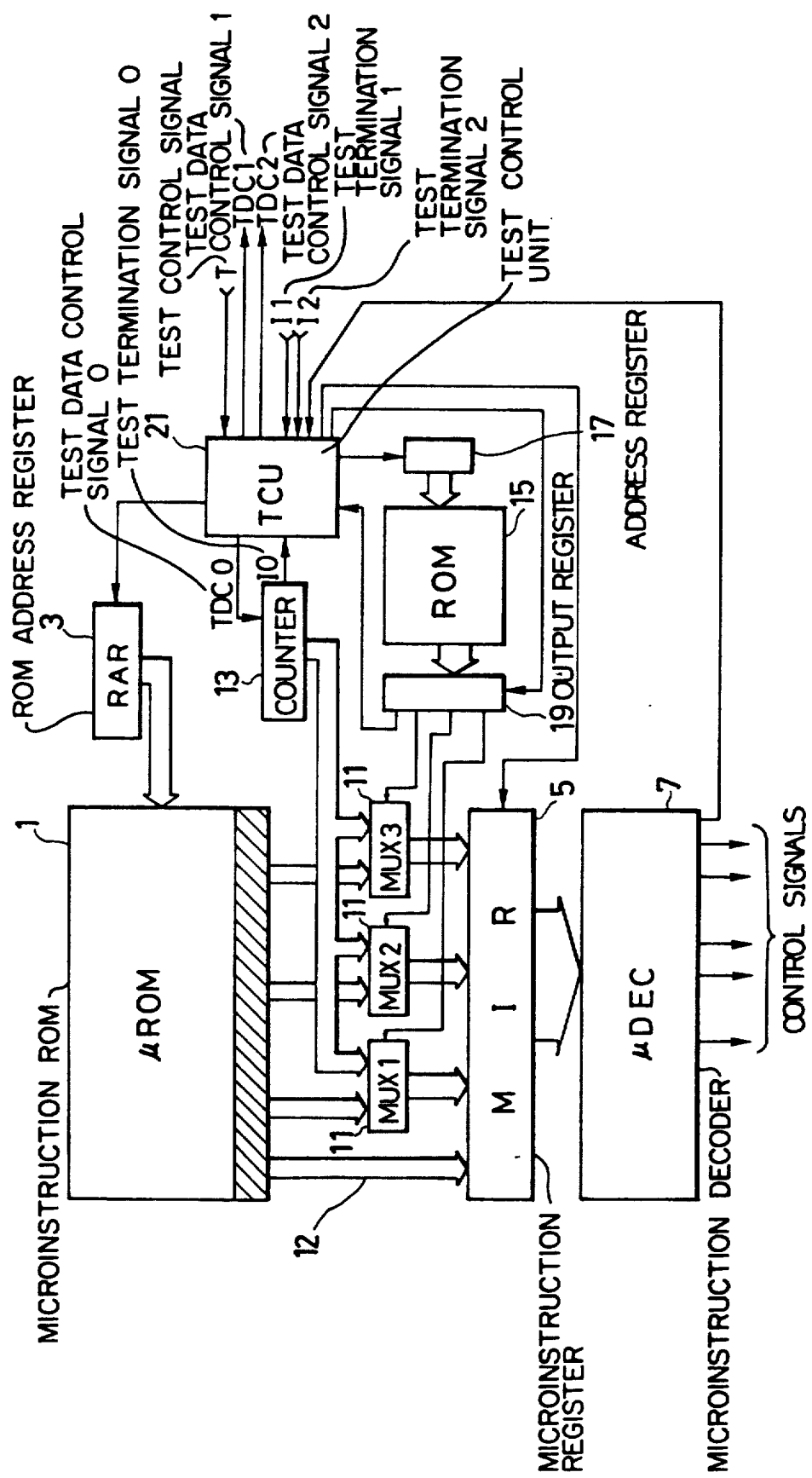
FIG. 3 is a block diagram showing an embodiment of a self-test circuit according to the present invention.

FIG. 3 is a view showing a self-test circuit according to an embodiment of the present invention. In this self-test circuit, predetermined codes of test microinstructions are selectively given by an element other than a ROM 1 which stores the microinstructions. In FIG. 3, the same parts have the same numbers as in FIG. 1, so that their explanations may be omitted.

The μ ROM 1 of FIG. 3 stores high functional microinstructions such as loop microinstructions, conditional branch microinstructions or subroutine branch microinstructions. The μ ROM 1 also stores primary test microinstructions, which are usually almost the same as those for normal operation (normal microinstructions).

In FIG. 3, the self-test circuit comprises three 2-input selector-arrays 11 (MUX1, MUX2 and MUX3) which are disposed between the ROM 1 and a microinstruction register (MIR) 5.

One input of each selector of the selector-arrays 11 receives the primary test microinstructions from the ROM 1, while the other inputs of the selectors in the arrays 11 receive data from a data generator other than the ROM 1.

During the self-test, the data from the data generator are selected according to select signals as codes of predetermined fields of the primary test microinstructions, to generate secondary test microinstructions to be given to the microinstruction register 5.

The selector-arrays 11 are also able to select the primary test microinstructions they are as the secondary test microinstructions to supply them to the microinstruction register 5.

During the self-test, the ROM 1 outputs each primary test microinstruction which has a plurality of fields. Among these fields, specific ones are given test data from the data generator. To do so, there are disposed the plurality of selector-arrays 11 corresponding to the specific fields.

Figure 4:
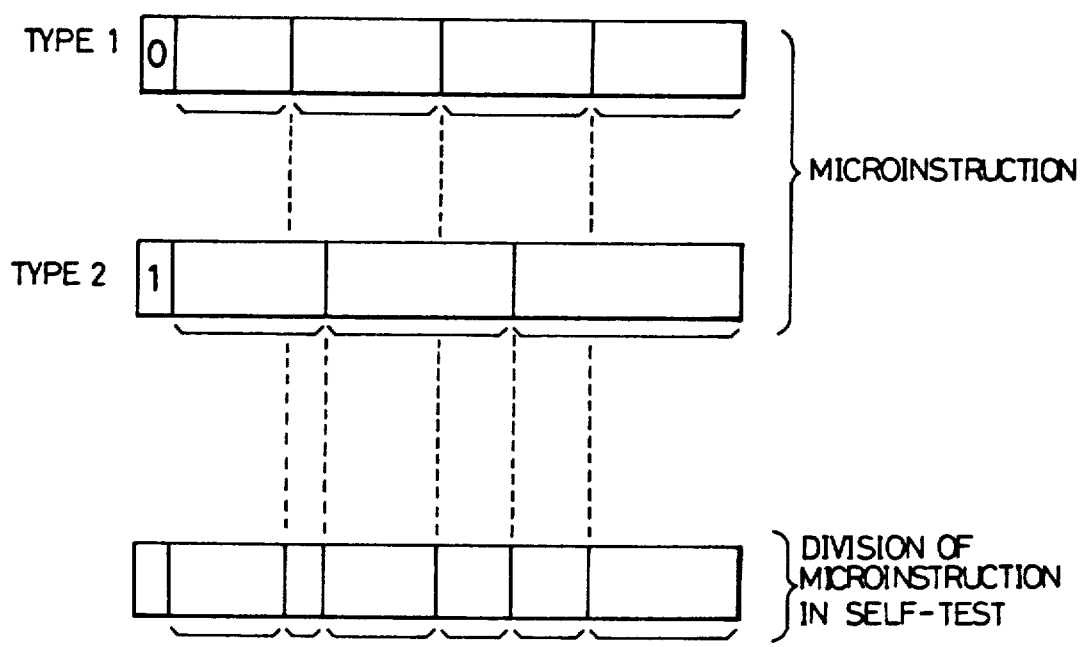
FIG. 4 is a view showing arrangements of fields of microinstructions of the embodiment of FIG. 3.

For example, if there are two kinds (type 1 and type 2) of normal or primary test microinstructions constituted by a plurality of totally different fields respectively as shown in FIG. 4, six fields may be obtained by overlapping the microinstructions of type 1 and type 2. For these six fields, the selector-arrays 11 are provided respectively. With this arrangement, fields of each primary test microinstruction outputted from the ROM 1 are selectively masked according to different select signals, and data from a counter 13 acting as the data generator are written in the masked fields.

The masking is not necessarily carried out for all the fields of each primary test microinstruction, or not necessarily carried out for all bits of each field of the primary test microinstruction. It is possible to provide the plurality of selector-arrays 11 for one of the fields. The masking may properly be carried out to realize a detailed and efficient self-test.

As described before, recent information processors employing microprogram control system contain high functional microinstructions such as loop microinstructions, conditional branch microinstructions or subroutine branch microinstructions. Sometimes, a field of microinstructions in which control functions far executing microprograms partly overlap a field of another microinstruction in which operation of hardware to be tested is described. This case may happen in setting an initial value in a loop counter, or in setting a branch microaddress. However, essentially the functions of these microinstructions are independent of each other, so that substantial parts of them may be separated from each other. By designing a field in which the control functions for executing microprograms are written not to be masked, the control functions for executing microprograms will not be affected by the masking during the self-test. Since the field for the control functions is always available during the self-test, the test can be performed efficiently. In FIG. 3, this sort of field which is not masked is indicated with a data flow going from the ROM 1 directly to the microinstructions register 5.

Although the data generator for providing data to one input of each selector in the selector-arrays 11 is the counter 13 according to the embodiment of FIG. 3, the data generator may be hardware such as a linear feedback shift register or that which can carry out counting and shifting operations. The shifting operation can effectively be used, for instance, for self-testing conditional branch microinstructions in which flip-flops to be referenced are indicated by corresponding bits, or self-testing a special flip-flop with setting and resetting microinstructions. Although the linear feedback shift register can simply constitute the data generator, it is not always easy to generate microinstructions required for a self-test by the linear feedback shift register, except for the case of giving all outputs of the data generator to the fields of a microinstructions. Therefore, careful consideration need be given in employing a linear feedback shift register as the data generator.

The timing of changing (counting up) output data of the counter 13, etc., may be every proper clock cycle (for example, first, second and fourth cycles) or every execution of a loop microinstruction. This timing is controlled by mode control information stored in a ROM 15. By properly controlling the timing, the degree of freedom in preparing the test microprogram increases, test data appropriate for the structure of hardware to be tested are supplied, and a more efficient test is performed.

The ROM 15 stores information for determining operational modes of a plurality of functional blocks which act, in self-testing respective functional blocks, as data generators for generating test data. The ROM 15 further stores judgment information for judging the completion of each self-test sequence as well as self-test controlling information and select signals for selecting the selector-arrays 11.

Each piece of information is read out of the ROM 15 according to an address given by an address register 17 and stored in an output register 19. The select signals are given to corresponding ones of the selector-arrays 11, while the control information and judgment information are given to a control circuit (TCU) 21.

During normal operation, the selector-arrays 11 always select outputs of the ROM 1. The control information and judgment information related to the self-test does not influence the normal operation. For this purpose, the control circuit 21, for example, prepares a mode signal which distinguishes; normal operation from self-test operation. According to the mode signal, outputs of the output register 19 are controlled.

During normal operation, the address register 17 always outputs a first address (an address of the control information firstly used for the self-test) of the ROM 15 so that the self-test is easily started.

The control circuit 21 is controlled by a control signal T, given externally. According to the control signal T, the information processor judges whether it is in the normal operation or the self-test operation. The control signal T is, for instance, always "1" during the self-test operation, or the control signal changes from "0" to "1" to trigger the self-test. Under normal operation, normal microinstructions are supplied from the μ ROM 1 to the selector-arrays 11, which supplies the received normal microinstructions, as they are, to the microinstruction register 5.

When the control signal T instructs to start the self-test, the control circuit 21 carries out initialization necessary for starting the self-test. In this initialization, a first address of a primary test microinstruction is set in the RAR 3, the address register 17 is enabled by the following signals from the control circuit 21 to count up or down, and the contents of the output register 19 are outputted to the selector-arrays 11, etc.

As described before, at the start of the self-test, the address register 17 holds the first address and the output register 19 stores the contents corresponding to the first address. However, until the self-test is started, outputs of the output register 19 have being invalidated by mode signals from the control circuit 21.

An information processor is so constituted that the self-test starting signal can be generated under any operating state. To prevent unforeseen operation of the information processor from occurring, the microinstructions register 5 outputs an invalid microinstruction such as "NO OPERATION", at least in the initializing cycles.

When one self-test sequence is completed, the control circuit 21 instructs the RAR 3 and address register 17 to count up or down to start reading test microinstructions of the next self-test sequence.

The control circuit 21 processes the control information given from the ROM 15 through the output register 19 and provides signals TDC0 to TDC2 indicating operational modes to data generators, respectively. The control circuit 21 also receives termination signals I1 to I2 indicating the completion of data outputs from the data generators which have received the signals TDC1 to TDC2, respectively, as well as receiving judgment information corresponding to a test sequence just given from the ROM 15 to judge whether or not the test sequence has terminated.

When a microinstruction is used as a signal to start or terminate a test sequence, information contained in this microinstruction shall be sent from a microinstruction decoder (DEC) 7 to the control circuit (TCU) 21. For this purpose, a path extending from the microinstruction decoder 7 to the control circuit 21 is shown in FIG. 3. Including this signal, the control circuit 21 of FIG. 3 receives a plurality of termination signal. However, all of these termination signals are not always required, but, taking the structure of microinstructions and the kind of test sequences into consideration, necessary ones of the termination signals shall properly be selected.

When it is a simple case which requires only one kind of judgment information related to the termination of a test sequence, the ROM 15 and register 19 are not required to store this judgment information. Essentially, the control circuit 21 is drawn to virtually indicate the control of the self-test so that, if the case is simple, a termination signal may be used, as it is, as an initializing signal or a starting signal of the next test sequence.

These modifications and alterations do not depart from the spirit of the present invention and are included in the scope of the invention.

Operation of the embodiment of the present invention will be explained.

Figure 5:
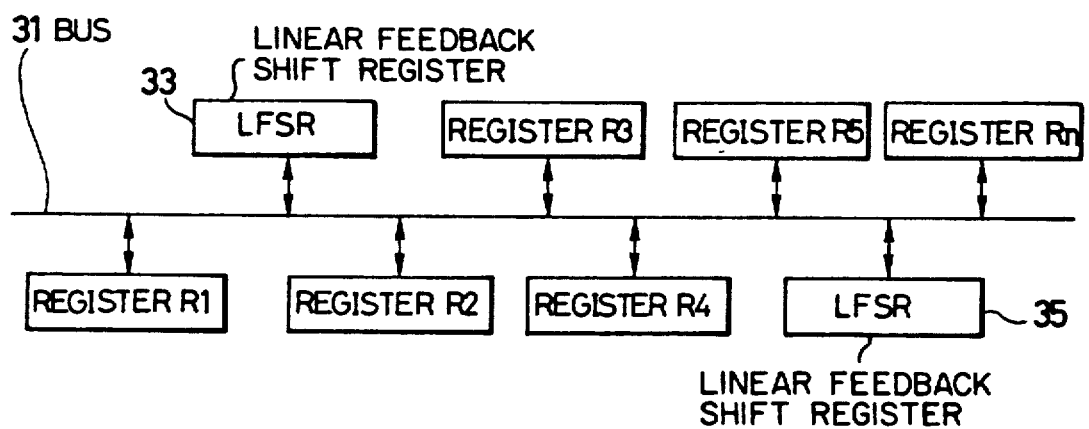
FIG. 5 is a view showing an arrangement of registers in the embodiment of FIG. 3.

Noting FIG. 5, registers R1 to Rn connected to a bus 31 are collectively tested. Through the bus 31, data are inputted to and outputted from the registers R1 to Rn. A linear feedback shift register 33 generates pseudo random pattern data to be given to the respective registers. A linear feedback shift register 35 compresses data read out of the respective registers to prepare signatures.

Firstly, the control signal T is given to the control circuit 21 to start the self-test. A first address of the test microprogram is set in the RAR 3. The address register 17, which is holding a first address of the ROM 15 storing control information of the self-test, is enabled to count up or down. The contents of the ROM 15 at the first address are outputted from the output register 19.

According to the address set in the RAR 3, a primary test microinstruction is read out of the μ ROM 1. Among respective fields of the read primary test microinstruction, a write field which holds information indicating a register into which data given to the bus 31 are written is masked. To this masked field, the counter 13 outputs data according to an instruction signal TDCO. The data are selected by the selector-arrays 11 according to selection signals given by the ROM 15, and the data are written in the masked write field of the primary test microinstruction to form a secondary test microinstruction. The secondary test microinstruction thus formed is given via the microinstruction register 5 to the μ DEC 7, which decodes the secondary test microinstruction.

As the counter 13 counts up or down, signals for controlling inputs and outputs are given to respective registers to be tested to sequentially store, in these registers, respectively, with different data generated by the linear feedback shift register 33.

When the operation of the counter 13 ends, the counter 13 gives a termination signal 10 to the control circuit 21. The control circuit 21 also receives judgment information from the ROM 15 and judges that the data writing test sequence of writing the data into the respective registers has been completed. Then, the control circuit 21 instructs the RAR 3 and address register 17 to count up or down to execute the next test sequence. In this way, test sequences are one by one executed to self-test the respective functional blocks.

Next, is the step of reading data from the respective registers to be tested. Among respective fields of each primary test microinstruction read out of the μ ROM 1, a read field which holds information indicating a register from which data are to be read to the bus 31 is masked. The counter 13 outputs data corresponding to the masked field. The data from the counter 13 are selected for the masked read field of the primary test microinstruction to form a secondary test microinstruction, which is decoded in the μ DEC 7 to provide a control signal for a corresponding one of the registers to be tested.

At the same time, the linear feedback shift register 35 is activated, and data are sequentially read out of the respective registers and given to the linear feedback shift register 35, in which the data are compressed to prepare signatures.

After that, the above-mentioned data writing and reading operations are repeated such that outputs of the linear feedback shift register 33 are inverted and used as writing data to the respective registers to be tested. In this way, the registers connected to the bus 31 are tested. Nearly, the identification of the respective registers and writing and reading tests of information of "0" and "1" on the respective registers are carried out.

If there is a vacant code in the read field of a test microinstruction, undefined data may be compressed in preparing signatures if the code is specified. To prevent this, it is necessary, for example, to design the μ DEC7 so that it does not generate a vacant code. As described above, predetermined fields of test microinstructions are provided with data from the counter 13 during a self-test. Therefore, a test microprogram needed for the self-test may be composed of less than ten steps. Therefore, the microprogram will be small compared to those of the prior art.

If microinstructions have a loop function and conditional branch function, mentioned before, these functions may be utilized to judge the completion of a test sequence and to start the next test sequence. Termination signals from the respective test data generators are not needed, so that control will be greatly simplified. Further, if there are subroutine branch microinstructions, a complicated test microprogram can be realized with a small number of steps.

In these self-tests, the next microinstruction of a test microprogram stored in the μ ROM 1 is executed according to completion signals from respective test data generators, so that the size of the test microprogram is greatly reduced (During the test, outputs of the counter 13 instead of outputs of the μ ROM 1 are supplied to the microinstruction register 5.)

The counter 13 may have a simple shift function, etc., depending on the characteristics of the microinstructions. On the other hand, the input data generators for providing data to respective functional blocks to be tested may not only be ROMs or simple shifters which are usually provided for a microprocessor but also a data generator exclusively for the purpose. This exclusive data generator is added to the microprocessor in advance and properly controlled together with those usual data generators during the self-test, so that the respective functional blocks may be self-tested more minutely and efficiently.

Between the μ ROM 1 and the microinstruction register 5, there are disposed only the selector-arrays 11, so that an operation margin of the μROM 1 may not be deteriorated.

Figure 6:
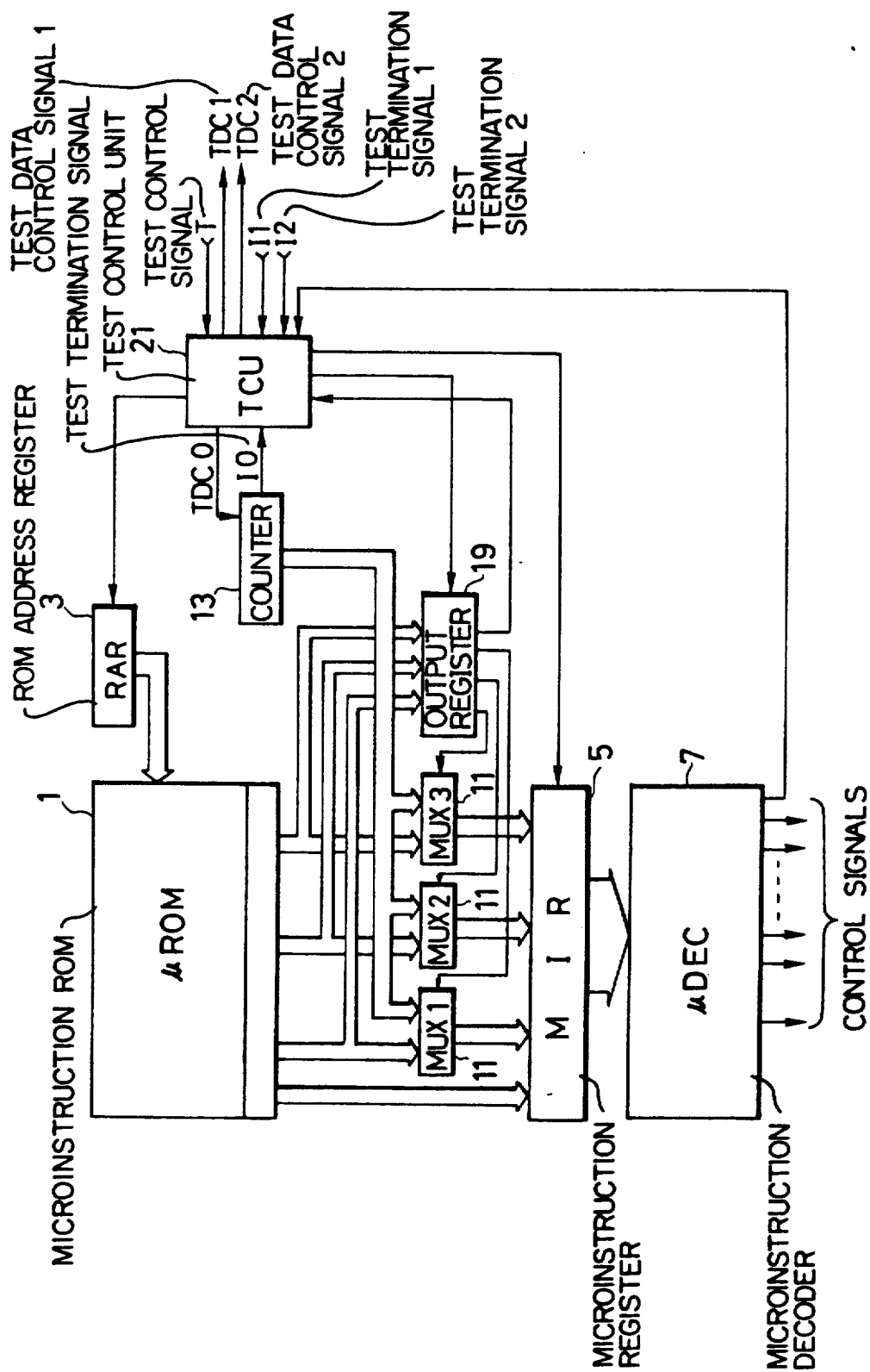
FIG. 6 is a block diagram showing a self-test circuit according to another embodiment of the present invention.

FIG. 56 is a block diagram showing another embodiment of the present invention. In FIG. 6, parts represented with the same reference marks as those of FIG. 3 have the same functions as in FIG. 3. so that their explanations will be omitted.

Compared with the embodiment of FIG. 3, the embodiment shown in FIG. 6 is characterized in that the control information of self-test which has been stored in the ROM 15 in the first embodiment is stored in a ROM 1 and that a RAR 3 acts as the address register 17 of the ROM 15 of the first embodiment. Since the ROM 1 stores both the control information of self-test and microinstructions, a predetermined bit of each microinstruction may be used to judge whether an output of the μ ROM 1 is a microinstruction or the control information of a self-test.

In this embodiment also, as explained with reference to the embodiment of FIG. 3, various modifications and alterations are possible without departing from the spirit of the invention.

According to the second embodiment, the self-test control information is stored in the μ ROM 1 so that the size of a test microprogram may be increased by about 10% to 20%, compared to the embodiment of FIG. 3. However, a ROM for storing the self-test control information is not needed in the second embodiment, so that the arrangement and design of the second embodiment may be simplified.

In summary, according to the present invention, test data generated by test data generating means are used as information in predetermined fields of test microinstructions, in which a self-test is carried out. Therefore, without increasing the size of the structure and without complicating the structure, the size of a test microprogram containing the test microinstructions can be minimized. Test data generating means for generating test data for functional blocks to be tested in an information processor is controlled by microinstructions. This test data generating means may be realized by a functional block originally provided for the information processor or by a functional block which is added to the information processor for the purpose of the self-test and can be controlled by microinstructions. The test data generating means can, therefore, generate various test data to efficiently and minutely achieve the self-test for many elements of the information processor.

Various modifications will become possible for those skilled in the art after receiving the teachings of the present disclosure without departing from the scope thereof.

What is claimed is:

1. A self-test circuit of an information processor including a microprogram control system, the self-test circuit carrying out a self-test inside the information processor and comprising:
   test data generating means for generating test data to be written in specific fields of each of primary test microinstructions; and
   selection controlling means for receiving microinstructions including the primary test microinstructions as well as receiving the test data from said test data generating means, said selection control means masking the specific fields of each primary test microinstruction and supplying the test data from said test data generating means to the masked specific fields during the self-test to form a secondary test microinstruction, the number of the primary test microinstructions being minimized because the test data from said test data generating means are used as the data of the specific fields of the primary test microinstructions,
   wherein said information processor and said self-test circuit form an integral operating unit.

2. The self-test circuit as claimed in claim 1, wherein said selection controlling means are not applied to specific fields of the microinstructions designating microsequence functions, or are so constituted to pass such said specific field during the self-test in the same manner as the normal operation of the information processor.

3. The self-test circuit as claimed in claim 1, wherein said test data generating means comprises a counter for outputting count data.

4. The self-test circuit as claimed in claim 1, wherein said test data generating means comprises a shift register for outputting shifted data.

5. The self-test circuit as claimed in claim 1, wherein the said selection controlling means comprises:
   controlling means for supplying select signals, the select signals specifying the specific fields of each primary test microinstruction as well as specifying test data to be written in the specific fields; and
   a plurality of selectors for masking the specific fields of the primary test microinstruction and supplying the test data to the masked specific fields according to the select signals sent from the controlling means.

6. The self-test circuit as claimed in claim 1, wherein the microinstructions including the primary test microinstructions are supplied from a microinstruction storage ROM to said selection control means.

7. The self-test circuit as claimed in claim 1, further comprising a microinstruction storage memory storing said microinstructions, including the primary test microinstructions, and a microinstruction register temporarily storing said microinstructions including the secondary test microinstructions, and supplying them to the information processor, wherein said selection control means is positioned between said microinstruction storage means and said microinstruction processor.

8. The self-test circuit as claimed in claim 1, wherein said test data generating means comprises a circuit for outputting count data and shifted data.

9. The self-test circuit as claimed in claim 1, wherein said test data generating means comprises a linear-feedback shift-register.

* * * * *